March 25, 1969  C. O. MERCHANT  3,435,179
CATHODE RAY TUBE COLOR GUN CENTERING BRACE WELDING SYSTEM
Filed Oct. 14, 1966  Sheet 1 of 2
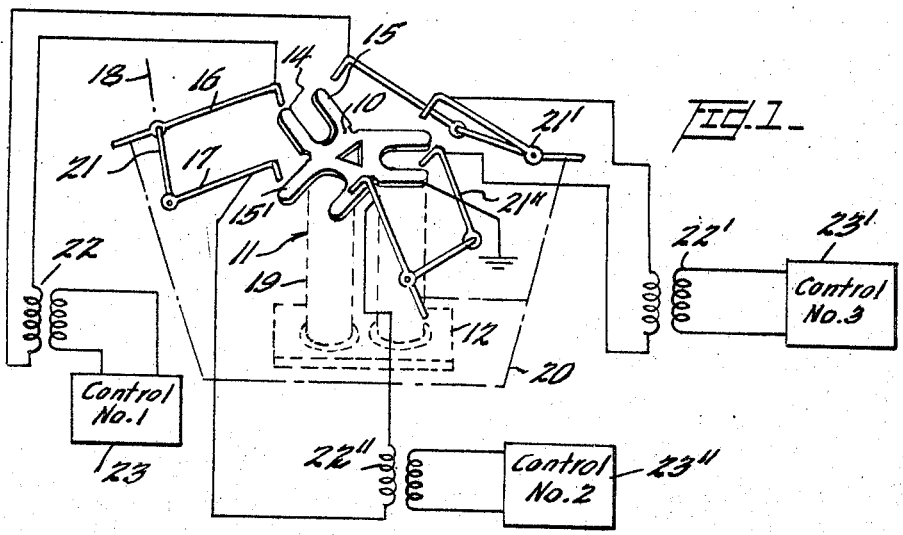
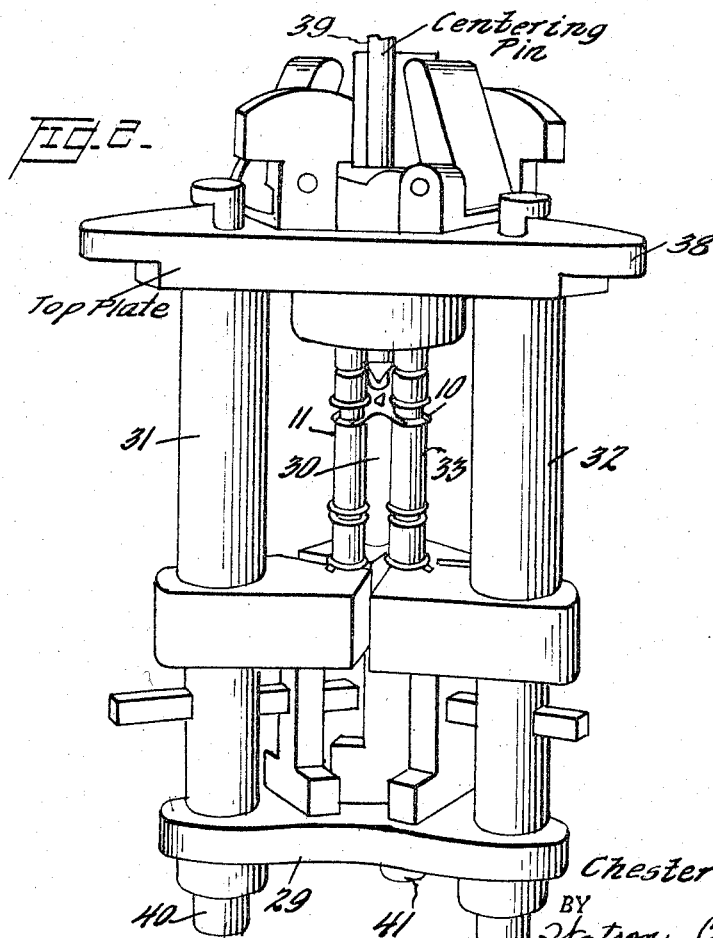
INVENTOR.
Chester O. Merchant,
BY Watson, Cole, Grindle
and Watson
ATTORNEYS

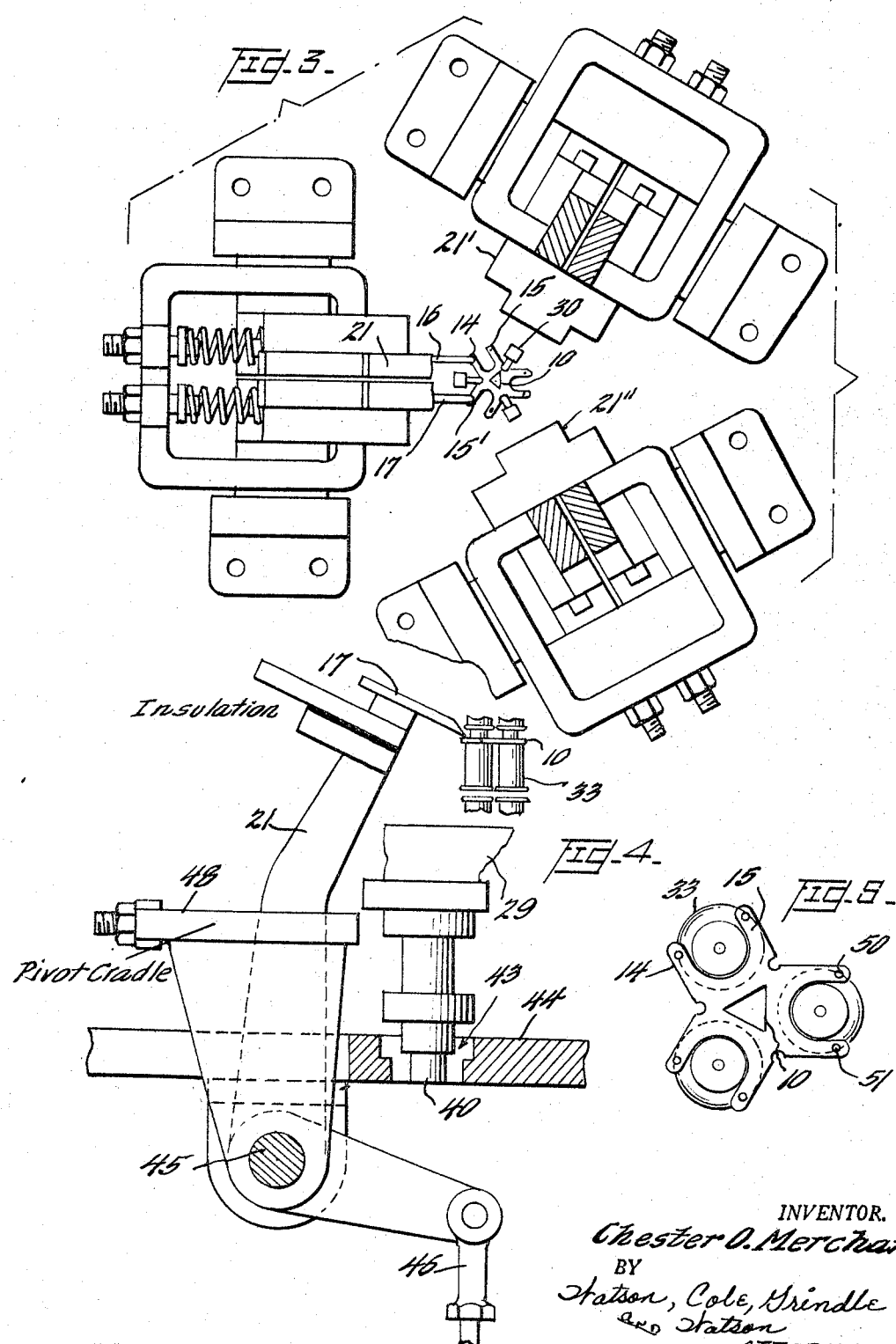

United States Patent Office 3,435,179
Patented Mar. 25, 1969

3,435,179
CATHODE RAY TUBE COLOR GUN CENTERING BRACE WELDING SYSTEM
Chester O. Merchant, Owensboro, Ky., assignor to Kentucky Electronics, Inc., Owensboro, Ky., a corporation of Delaware
Filed Oct. 14, 1966, Ser. No. 586,834
Int. Cl. B23k 9/00
U.S. Cl. 219—78                    4 Claims

ABSTRACT OF THE DISCLOSURE

A special purpose welding assembly is provided for simultaneously positioning and welding a centering brace to three similar electrodes of an electron gun of a three gun color picture tube at six extending finger portions.

---

This invention relates to the manufacture of electron gun assemblies for color picture tubes and, more particularly, to welding apparatus for affixing centering braces to the electrodes of a partially completed electron gun assembly.

It has been a standard procedure in a three electron gun color picture tube to provide an accelerating or focusing electrode assembly at common potential in all three guns. Accordingly, three electrodes need be welded together inside the tube with access at a single connector lead in the stem of the tube. Since the focus electrodes to be maintained at common potential generally comprise a cylindrical body with two adjacent cylindrical portions of different diameter, they are generally maintained in spaced position during manufacture of the assembly by a floating centering brace that has three U-shaped channels with fingers encompassing the respective smaller cylindrical body portions to abut and position the three guns. After permanently affixing the electrodes in place by surrounding brackets on all the electrodes by a molten glass bead, the floating centering brace conventionally is centered and welded by separate sequential operations to the three respective electrodes to constitute the electrical conductor therebetween and a strengthening brace member.

In the latter operation generally six weld spots are necessary at precise locations difficult to maintain within proper tolerances by hand welding operations.

Accordingly, it is the object of this invention to provide an improved semi-automatic welding system for welding and positioning centering braces in a color gun.

Another object of the invention is to provide welding apparatus for simultaneously and reliably making multiple welds at various positions in an electron gun assembly.

Thus, a multiple head welder is provided with pivotable heads by this invention for simultaneously entering the gun at different positions and welding a centering brace to three similar electrodes in three different guns of a partly assembled three beam color tube electron gun assembly, as may be seen from the detailed description of the following specification and accompanying drawings, wherein:

FIGURE 1 is a schematic diagram of a welder system afforded by this invention;

FIGURE 2 is a perspective view generally in elevation of a color gun jig holding a partially assembled electron gun assembly;

FIGURE 3 is a plan view, partly in section of a welding station;

FIGURE 4 is an elevation view, partly in fragmentary section of a portion of the welding station; and FIGURE 5 is an enlarged plan view of a centering brace welded to the electron gun assembly in accordance with the teachings of this invention.

As seen in FIGURE 1, a typical form of the centering brace 10 is shown in electron gun assembly 11 and is held in position on some positioning means 12 and aligned to have three substantially U-shaped channel finger portions 14–15 extending at substantially 120° intervals about and encircling cylindrical electrode members of the gun to float fit over the electrodes. This centering brace is affixed at a central orientation in the welding position so that two adjacent welding electrode fingers 16–17 can pivot about axis 18 to contact and weld fingers 14 and 15' to their adjacent electrodes 19, etc., at exactly determined weld positions 50, 51, etc., seen from FIGURE 5 as later described. Each of three pivotable welding heads 21 is ganged as shown by dotted line 20 for simultaneous positioning to weld all six brace fingers 14–15 at the same time. However, to provide optimum control of welding current with wear of welding electrodes, variations in brace materials, dimensions, or heat dissipation at different positions, etc., each separate pivotable welding head 21, which has insulating cross members connecting the two prongs 16, 17, have these prongs connected through respective transformer 22, secondary windings to two separate welding power control systems 23, 23' etc. which incorporates selective current controls (not shown) that may be set individually by an operator. These are conventional welder control units which meter out a desired increment of welding energy when the electrodes 16, 17 are in contact holding the brace fingers 14, 15 against the shoulders of electrodes 33 (FIGURE 5). It is noted that this configuration produces a series weld current flow between the arm 14 of the spacer 10 through the electrode 19 and back to the arm 15 of spacer 10 to provide a reduced resistance over that which would be required by a circular path through spacer arms 14, 15.

Because of the position of brace 10 in a partially assembled color gun assembly 11, little room is afforded to maneuver the welding heads 21, and they must be precisely spaced relative to the gun orientation to pivot into place between closely spaced electrodes along the gun axis. This is accomplished by retaining the gun 11 in the jig assembly 29 after glass bead 30 is affixed to permit the pivoted welding heads to reach between the two axial framework members 31, 32 to contact the fingers 14, 15 of centering brace 10 which is held in precise centered position to rest on the shoulders of the lower larger diameter cylindrical portion of focus or accelerating electrode 33. This orientation may be seen in the views of FIGURES 4 and 5. Thus, the gun need not be disassembled from the jig nor need the glass beads be allowed to fully cool before the jig is placed in its welding location position to weld the center brace 10. To register the center brace 10, the tapered triangular shaped centering pin 39 is inserted through a triangular guide hole in top plate 38 to mate with and center the centering brace 10 through its triangular shaped hole when the taper engages the hole to a snug fit. This spaces the center of the brace equidistant from the centers of the three guns. As shown in partial broken away section in FIGURES 3 and 4, the three positioning studs 40, 41, 42 of the jig 29 are mated in registering holes 43 on frame 44. Therefore, the gun is held in precise position and alignment about the three pivoted welders 21 positioned at substantially 120° intervals about the jig and gun assembly.

Each welder head 21 is thus pivoted as at shaft 45 to permit a foot or hand operated lever (not shown) coupled to links 46 on all three welding heads 21 to pivot them simultaneously between two limiting positions with the first in welding contact with the brace 10 (shown in FIGURE 4) and the other (not shown) outside the framework members 31, 32 of the jig 29 permitting the entry or removal of the jig without interference. In the pivot cradle 48 adjustable springs for maintaining appropriate welding contact pressure on the electrodes are positioned.

It is noted that the welding electrodes 16, 17 straddle the glass bead 30 and weld the brace fingers 14, 15' onto two different electrodes. This arrangement provides not only convenient access within the jig framework members 31–32 but also provides maximum weld reliability, since even if electrode contact by any one welding head is defective, there is still at least one firm weld on each electron gun electrode provided by one of the other welding heads.

Accordingly, there is afforded by this invention an improved semi-automatic welding system for attaching a brace between similar electrodes in the three electron guns of a picture tube. These novel aspects of the invention descriptive of its spirit and scope are defined with particularity in the appended claims.

What is claimed is:

1. Apparatus for manufacturing a three gun assembly for a cathode ray color picture tube having a plurality of cylindrical electrodes for each beam, one of which in each gun has a cylindrical body with two adjacent cylindrical portions having two different diameters comprising in combination, a single assembly jig having at least three axial framework members holding the electrodes of each gun in precise position when receiving a molten glass bead between two adjacent framework members encompassing a portion of each electrode to retain the electrodes permanently together in position, a gun assembly for said jig with a floating centering brace positioned between the three guns having U-shaped opening brackets encompassing with two extending fingers and abutting the outer smaller circumference of said cylindrical electrode in each of the three guns having two different diameters to hold the respective electrodes and guns in spaced relationship, means for positioning the jig in a predetermined welding location, means to hold the centering brace in a fixed centered location, three welding heads each having a pair of extending electrodes spaced to contact a set of two of said fingers on said centering brace at said location, pivot means moving each welding head between two limiting positions, one position being between said jig framework members holding the fingers in electrical contact against the cylindrical portion of larger diameter on their corresponding electrodes and the other position being removed from between the framework members of the jig when held by said positioning means in said predetermined location to thereby permit placement and removal of the jig at said location, means simultaneously moving said pivot means of all three welding heads to the respective limiting positions, and resistance welding means comprising separately adjustable welding current sources connected with each pair of welding electrodes operable to meter out a predetermined amount of welding energy when the electrodes are in electrical contact holding the fingers against their corresponding electrodes, whereby six welds are simultaneously made betwen the fingers of the centering brace and the electrodes which they encompass.

2. A welder for affixing a brace to corresponding electrodes of three separate electron guns of a picture tube color gun assembly comprising in combination, jig means holding the color gun assembly in a fixed orientation at a welding position with a plurality of electrodes spaced and permanently held in axial relationship, a centering brace having three substantially U-shaped channel finger portions disposed about and encircling three smilar cylindrical electrodes in all three guns to float fit between two axially disposed electrodes over one of such electrodes and about a portion thereof, a welder having three pivotable electrode assemblies each comprising a pair of electrodes spaced at substantially 120° intervals about the welding position to contact the six corresponding finger portions of the centering brace, and means simultaneously pivoting the three electrode assemblies into contact with the centering brace adjacent the three separate electron guns for welding it to the corresponding three electrodes simultaneously.

3. A welder as defined in claim 2 wherein the electron guns are held in place by three glass beads pressed about brackets on each electrode and the brace has three U-shaped channels each of which encompasses and abuts the cylinder of an electrode in the gun assembly and extending at substantially 120° to present two finger portions extending between two adjacent of said glass beads, and wherein the electrode assemblies of each pivotable welder assembly have a pair of extending electrodes spaced to contact two of the finger portions of the brace on the different electrodes on opposite sides of the glass beads.

4. A welder as defined in claim 2 wherein the jig means includes a tapered centering tool, the brace includes an aperture for receiving the tool in mated position and the centering tool is mated to hold the brace in position in the jig means at the welding position.

References Cited

UNITED STATES PATENTS

| | | | |
|---|---|---|---|
| 2,914,317 | 11/1959 | Miller et al. | 269—40 |
| 3,289,268 | 12/1966 | De Bernardis | 29—203 X |
| 3,340,035 | 9/1967 | Hajduk | 29—25.16 X |
| 3,363,298 | 1/1968 | Merchant et al. | 29—203 X |
| 3,297,854 | 1/1967 | Kraner | 219—78 |

RICHARD M. WOODS, *Primary Examiner.*

B. A. STEIN, *Assistant Examiner.*

U.S. Cl. X.R.

219—107; 29—203